April 28, 1925.

O. C. TRAVER 1,535,879

ELECTRICAL SYSTEM OF CONTROL

Filed March 22, 1920   2 Sheets-Sheet 1

Inventor:
Oliver C. Traver,
by Albert G. Davis
His Attorney.

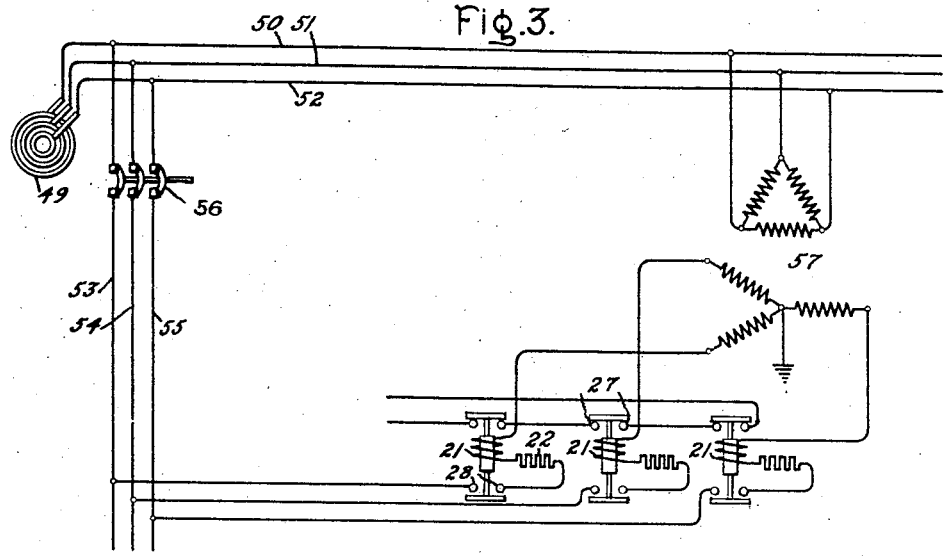
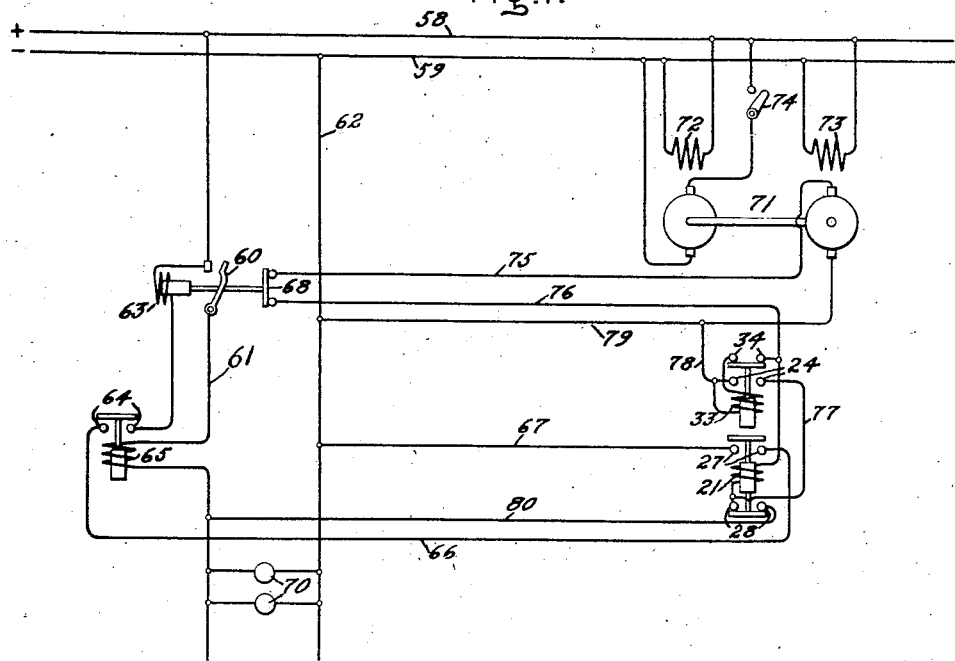

Patented Apr. 28, 1925.

1,535,879

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

ELECTRICAL SYSTEM OF CONTROL.

Application filed March 22, 1920. Serial No. 367,734.

*To all whom it may concern:*

Be it known that I, OLIVER C. TRAVER, a citizen of the United States, residing at Schenectady, in the county of Schenectady, State of New York, have invented certain new and useful Improvements in Electrical Systems of Control, of which the following is a specification.

My invention relates to electrical systems of control, particularly for the control of circuit interrupting devices and has for its object to provide an improved system for automatically controlling the reclosing of circuit interrupting devices in response to conditions in the circuits controlled by said devices.

According to one embodiment of my invention, I utilize an auxiliary source of voltage, usually of lower potential than the main source of supply, to effect automatic reclosing of a circuit breaker after it has opened in response to overload or similar trouble on the load circuit. The condition of the load circuit may be ascertained by impressing upon it the potential of the auxiliary source and noting the resultant current, which depends upon the impedance of the load circuit. When the load circuit is in a predetermined condition, mechanism is automatically set in motion to reclose the circuit breaker.

Figure 1:
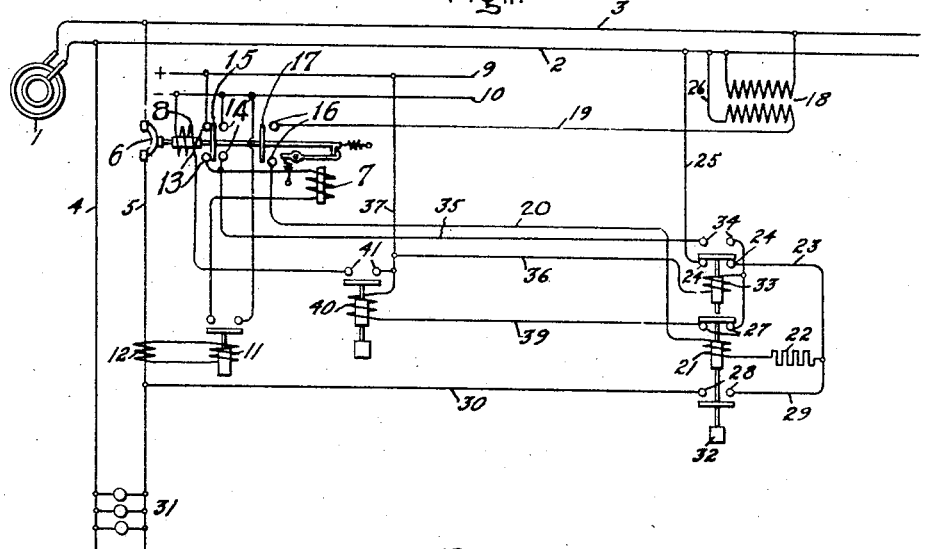
Figure 2:
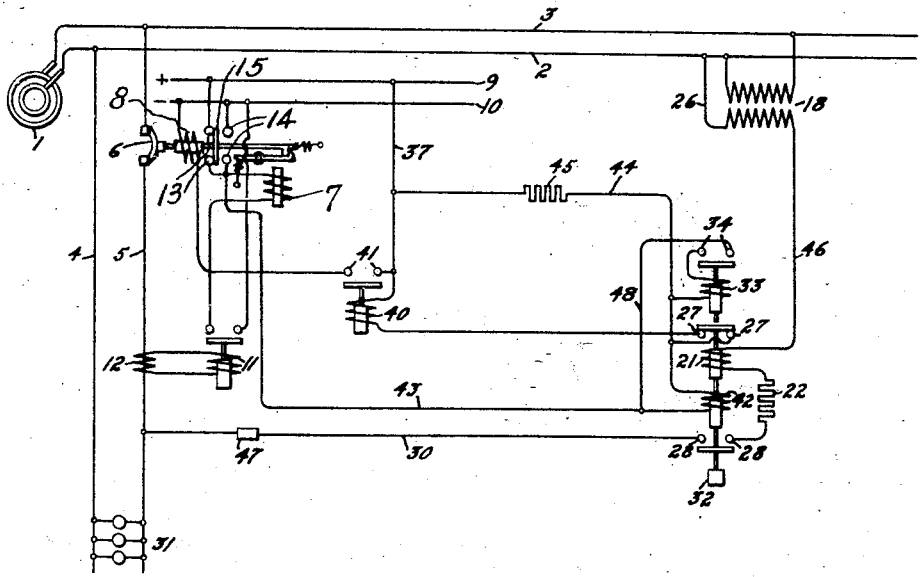

The novel features which I believe to be characteristic of my invention will be definitely indicated in the claims appended hereto, while the features of construction and mode of operation will be understood by reference to the following description taken in connection with the accompanying drawing which shows the preferred embodiments of my invention and in which:

Fig. 1 shows diagrammatically my invention applied to the control of a circuit interrupting device of an alternating current system of distribution; Fig. 2 is similar to Fig. 1, but embodies the features of my system of control in a modified form; Fig. 3 is a diagrammatic illustration of the application of the principles of my invention to a three phase alternating current system; and Fig. 4 shows diagrammatically the application of the principles of my invention to a circuit controlling device of a direct current system of distribution.

In Fig. 1, I show diagrammatically a single phase alternating current system of distribution in which a generator 1 supplies buses 2 and 3 to which one or more load circuits are connected. For purposes of illustration, I have shown one load circuit, which may supply either a power or lighting load, comprising conductors 4 and 5 connected to the buses 2 and 3 through a circuit breaker 6. By the term circuit breaker, I mean any circuit interrupting device adapted to automatically open and close an electric circuit. The circuit breaker 6 may be of any well known type, such as an oil circuit breaker with contacts submerged in an insulating liquid. The circuit breaker is opened by the trip coil 7 which releases the holding latch of the circuit breaker and is closed by the closing coil or solenoid 8, both these coils being energized from any suitable source such as the direct current buses 9 and 10. The circuit of trip coil 7 is controlled by a device responsive to predetermined abnormal conditions, which by way of illustration, is shown as an overload relay 11 connected to the load circuit 4 and 5, either directly in series or through a current transformer 12.

Associated with the circuit breaker 6 and controlled thereby is a double throw auxiliary switch comprising a pair of contacts 13, another pair of contacts 14, and a bridging member 15, the contacts 13 being bridged when the circuit breaker is closed and the contacts 14 being bridged when the circuit breaker is open. This double throw auxiliary switch controls the circuits of the indicating lamps, and the usual push button remote control switches, not shown, and also the circuit of trip coil 7, as contacts 13 must be closed to enable the overload relay 11 to close the trip coil circuit. A second auxiliary switch associated with the circuit breaker and comprising a pair of contacts 16, and a bridging member 17 controls the reclosing circuit of the circuit breaker as will hereinafter be described.

When the circuit breaker 6 opens in response to abnormal conditions, the energization of the closing coil 8 and hence the reclosing of the circuit breaker 6 automatically occurs in response to conditions on the load circuit and more particularly when the impedance of the load circuit is a predetermined amount. The circuit breaker 6 is therefore reclosed only when the abnormal conditions which caused the opening of the breaker have disappeared. By my invention the condition of the load circuit is determined by means of an auxiliary source, the potential of which can be so chosen as to be most suitable for ascertaining the impedance of the load circuit, and is preferably such that small variations in load impedance will cause substantial variations in the testing current which flows in the load circuit. I prefer to use an auxiliary source of supply of substantially lower potential than the main source. This auxiliary source of electromotive force for an alternating current system of distribution, such as shown in Fig. 1, may be a transforming means preferably inductively related to the main source of supply and connected to the main supply buses 2 and 3 or to conductors 4 and 5 on the supply side of the breaker 6. Transformer 18 is of the step-down type and serves therefore as a source of low potential which is substantially constant.

Normally when circuit breaker 6 is closed to connect the load circuit 4, 5 to the main source of supply 2, 3, I render the auxiliary source 18 ineffective, but upon the disconnection of the main source from the load circuit, I provide means for automatically rendering the auxiliary source effective. Means is also provided for then connecting the auxiliary source to the load circuit in place of the main source. The auxiliary supply circuit including the secondary of transformer 18 is from one side of the transformer secondary along conductor 19, through the auxiliary switch contacts 16, conductor 20, through a control means or reclosing relay 21, a resistance element 22, conductor 23, contacts 24, conductor 25, to the main bus 2 and thence by conductor 26 to the other side of the transformer secondary. This auxiliary supply or secondary circuit of transformer 18 is normally open at auxiliary switch contacts 16 to render the auxiliary source ineffective, when the breaker 6 is closed to connect the load circuit to the main source. Upon opening of the breaker 6, the closure of auxiliary switch contacts 16 completes the secondary or auxiliary supply circuit and renders the auxiliary source effective to circulate a current of low potential through the secondary circuit before described.

The next step is to connect the auxiliary source 18 to the load circuit to replace the main source. This is accomplished by the control means or reclosing relay 21 which is included in the auxiliary supply circuit. This control means operates two sets of contacts 27 and 28. Contacts 27 are closed and contacts 28 open when the relay is deenergized. When the control means 21 is energized from the auxiliary source 18, contacts 27 are opened and contacts 28 closed to connect the auxiliary source to the load circuit as follows: from one side of the secondary of transformer 18, conductor 19, through the auxiliary switch contacts 16, conductor 20, control means 21, resistance element 22, conductor 29, contacts 28, conductor 30 to the load conductor 5 on the load side of the breaker 6, thence through the load 31 to conductor 4, to bus 2 and back to the other side of the transformer secondary by conductor 26. It is observed that the closure of contacts 28 now connects reclosing relay 21 in series with the load circuit supplied from the auxiliary low potential source. The control means 21 may be provided with a retarding device 32 which functions to permit the control means to move instantly when energized to close contacts 28 but when deenergized to close contacts 27 with a time delay.

If desired, the resistance element 22 may be omitted but it is preferably used for the purpose of correcting for power factor variations which may exist between the load circuit and the auxiliary source and not as a current limiting means.

Operatively related to the control means 21 is an auxiliary control means or relay 33 controlling contacts 24 and 34. Contacts 24 are in the auxiliary supply circuit in series with the control means 21 and are normally closed. The energization of the control means 21 acts to move the auxiliary relay 33 to its energized position in which contacts 24 are opened and contacts 34 closed. This function of the control means 21 may be accomplished in various ways, but in the arrangement shown, the movement of the armature for the control means when energized, mechanically moves the armature for the auxiliary relay into a position to engage contacts 34. This operation of the auxiliary relay opens that path from the auxiliary supply circuit which is in shunt to the load circuit including conductors 25 and 23, while the closure of contacts 34 completes the energizing circuit for the auxiliary relay from the negative control bus 10, through auxiliary relay contacts 14 now closed by member 15, along conductor 35 through the contacts 34, winding of relay 33, conductors 36 and 37 to the positive control bus 9. The auxiliary relay now remains energized in position to hold its contacts 24 open and contacts 34 closed until its circuit is interrupted at auxiliary switch contact 14 by the closing of the breaker 6.

The auxiliary source 18 now connected to the load supplies a low potential to the load circuit through the control means 21 in series. This potential is substantially lower than the potential of the main source and causes a testing or "feeler" current to pass through the load circuit and control means which current is a measure of the load impedance. Should the impedance of the load circuit be low the current which will flow through the control means 21 will be sufficient to hold the contacts 28 closed and contacts 27 open. As the impedance of the load increases, indicating the disappearance of the short circuit, the current flow through the load circuit and control means diminishes until the impedance is such that it is safe to close the breaker 6. When the impedance reaches this predetermined amount the current through the control means 21 is insufficient to maintain it energized and the control means operates as an under-current responsive device to open its contacts 28 and close its contacts 27 with a time delay. Due to the relation existing between the auxiliary source of low potential and the impedance of the load circuit, small variations in load impedance produces variations in current flow through the control means of sufficient magnitude to enable the control means to determine with accuracy when the abnormal condition occasioning the opening of the breaker has disappeared.

Having tested the load circuit through the auxiliary source of supply and determined that it is safe to reconnect the load to the main source of supply, the opening of contacts 28 by the control means 21 serves to automatically disconnect the auxiliary source of potential 18 from the load circuit. The control means 21 also closes its contacts 27 to complete a circuit from the negative control bus 10 through the auxiliary switch contacts 14, conductor 35, contacts 34, held closed by auxiliary relay 33, through contacts 27 closed by the control means 21, through conductor 39, through a relay 40 and conductor 37 to the positive control bus 9. The completion of this circuit energizes relay 40 which operates to instantly close its contacts 41. The closure of contacts 41 completes the energizing circuit of the closing coil 8 which then operates to move the circuit breaker to its closed position to reconnect the load circuit to the main source of supply. The closure of the breaker 6 opens auxiliary switch contacts 14 to deenergize the auxiliary relay 33 and relay 40. In order to insure that the breaker 6 is positively closed, a time delay is introduced between the deenergization of relay 40 and the opening of its contacts 41.

It is therefore apparent from the foregoing description that I am able to effectively control the automatic reclosing of a circuit breaker in response to conditions of the load circuit which it controls whereby the breaker will be held open as long as the abnormal conditions exists but is automatically reclosed when the abnormal conditions disappear. The opening of the circuit breaker disconnects the load circuit from the main source and operates to substitute for the main source of supply an auxiliary source of substantially lower potential which is connected to the load circuit. This auxiliary source then causes a small current to pass through the load circuit and a control means in series. The control means measures the impedance of the load circuit and when the impedance of the load reaches a predetermined amount the control means operates to automatically disconnect the auxiliary source and effect the closure of the breaker to reconnect the load to the main source of supply.

In Fig. 2, I have shown a system of control embodying a modified form of my invention as applied to the system of Fig. 1. In this arrangement, instead of operating the control means 21 to connect the auxiliary source of supply 18 to the load circuit, from the auxiliary source of supply, I provide an auxiliary winding 42 on the control means which is energized from the direct current or separate source of control.

When the circuit breaker 6 opens in response to abnormal conditions, the auxiliary switch 15 acts to open contacts 13 and close contacts 14. Contacts 14 in closing completes a circuit from the negative control bus 10, through contacts 14, conductor 43, winding 42 of control means 21, conductor 44, resistance 45, conductor 37 to the positive control bus 9. The completion of this circuit when the breaker 6 opens energizes winding 42 causing it to move the control means 21 to close contacts 28 and open contacts 27. This operation of control means 21 by winding 42 connects the auxiliary source 18 of low potential to the load circuit 4, 5, through the main winding of the control means 21. The control means is then energized through its main winding to hold contacts 28 closed and contacts 27 open. The closure of contacts 28 connects the auxiliary source to the load by the completion of a circuit from one side of the transformer secondary 18, conductor 46, control means 21, resistance 22, contacts 28, conductor 30, fuse 47 to load conductor 5, thence through the load 31 to conductor 4, main bus 2 and conductor 26 to the other side of the secondary. The fuse 47 is provided to protect the equipment operating from the low voltage source from being subjected to high potential from the main source. This fuse may similarly be used in the system of Fig. 1.

In this modification, the auxiliary relay 33 is operated in the same manner as defined in the system of Fig. 1 to close its contacts 34 when the control means 21 is energized. Auxiliary relay contacts 24 are not necessary in the modified arrangement, as the control means is not initially energized from the auxiliary source 18. The closure of contacts 34 closes the energizing circuit for the auxiliary relay 33 in shunt to the winding 42 from conducter 43, through conductor 48, contacts 34, relay 33 to conductor 44, and as the winding 42 is of high resistance compared with relay winding 33, the closure of contacts 34 serves to short circuit winding 42. The relay 33 is thus held energized through its contacts 34 until auxiliary switch 15 opens its contacts 14 by the closure of the breaker 6.

Similar to the system of Fig. 1, when the impedance of the load reaches a predetermined amount, the current through the main winding of control means 21 falls to a value insufficient to maintain contacts 27 open and the control means therefore operates to close contacts 27 and open contacts 28 with a time delay as before described. The opening of contacts 28 disconnects the auxiliary source 18 from the load circuit and the closure of contacts 27 completes the energizing circuit for relay 40 which effects the reclosing of the breaker 6 as previously set forth.

In the system of control as shown in Figs. 1 and 2, instead of providing a time delay in the operation of the control means 21 to close its contacts 27, contacts 27 may be closed instantly to complete an energizing circuit for a separate time delay relay which after a certain time interval will close the energizing circuit for the relay 40.

In Fig. 3, I have shown diagrammatically the principles of my system of control for circuit breakers on alternating current systems of the three phase type. For purposes of clearness, I have only indicated a portion of my control system, it being understood to consist of an equipment for each phase, similar to the arrangement shown in Figs. 1 or 2. For the system of Fig. 3, the main source of three phase alternating current is the generator 49 supplying the buses 50, 51 and 52 to which is connected the load circuit 53, 54, 55 through the oil circuit breaker 56. The auxiliary source of low potential comprises the transformer 57 which may be connected to the main source of supply in any manner, one way being shown with the primary connected delta and the secondary in Y. A control means 21, corresponding to each phase, is arranged to connect the auxiliary source to the load current through contacts 28 upon opening of the breaker and to control the reclosing of the breaker through contacts 27 as has been described. The breaker 56 opens if trouble occurs on any phase and is reclosed by the control means controlling that phase, the reclosing circuit including the contacts 27 of each control means in series. In cases where a three phase load circuit is controlled by a circuit breaker in each phase, three duplicate systems of control will be used similar to Figs. 1 or 2.

Whereas I have shown my system of control applied to alternating current systems of distribution, this system is equally applicable for direct current systems of distribution. In Fig. 4 the buses 58 and 59 are connected to a main source of direct current voltage and connected to this main source through the circuit breaker 60 is a load circuit 61, 62. For purposes of illustration, I have shown the circuit breaker 60 in the form of a contactor which is held in closed position by an operating winding or coil 63. The energizing circuit for coil 63 is from one side of the main supply or the supply side of breaker 60 such as conductor 58, through the operating or closing coil 63, contacts 64 of an overload relay 65, through conductor 66, contacts 27 of the control means 21, through conductor 67 to the other side of the main supply, such as conductor 62. So long as the load conditions on the load circuit 70 are normal, the current through the coil of the relay 65 is not sufficient to operate the relay to open the contacts 64. The circuit breaker 60 controls an auxiliary switch 68 in the circuit of the control means 21 so that when the circuit breaker is closed, the circuit for the control means 21 is opened and therefore contacts 27 in the circuit of the coil 63 are closed.

Upon the occurrence of abnormal conditions in the load circuit 61, 62, the relay 65 operates to open contacts 64. The circuit of closing coil 63 is thereby opened and the breaker 60 operated to disconnect the load 70 from the main source of supply 58, 59. According to my invention, the main source of supply is now replaced by an auxiliary source of supply of substantially lower voltage than the main source and the auxiliary source connected to the load circuit through a control means which measures the impedance of the load.

The auxiliary source of low potential may be a battery or, as shown, a motor generator set 71, the fields 72 and 73 of which may be connected to the main supply buses 58 and 59, to maintain definite relation between the polarities of the main and auxiliary sources. The armature for the motor is also connected to the main supply buses through preferably a switch 74, which, if desired, can be automatically controlled by the operation of the breaker 60.

When the circuit breaker 60 opens, as shown in Fig. 4, auxiliary switch 68 is closed and a circuit is completed from one side of the auxiliary source through conductor 75, auxiliary switch 68, conductor 76, to the control means 21, thence by conductor 77, through contacts 24 closed by the auxiliary relay 33, conductors 78 and 79 to the other side of the auxiliary source. As before described, the completion of this circuit, energizes the control means 21 which operates to open contacts 27 and close contacts 28. The closure of contacts 28 connects the auxiliary source 71 to the load circuit through the control means 21 as follows: from the auxiliary source 71, conductor 75, auxiliary switch 68, conductor 76, control means 21, contacts 28, conductor 80, load conductor 61, load 70, load conductor 62, conductor 79, back to the auxiliary source. The energization of control means 21 operates auxiliary relay 33, as before, to open contacts 24 and close contacts 34. Contacts 24 opens that part of the circuit from the auxiliary source 71 including conductors 77 and 79 which is in shunt to the load, while the closure of contacts 34 completes the energizing current for auxiliary relay 33 to hold it in energized position. This circuit is from one side of auxiliary source 71, to conductor 79, conductor 78, relay 33, contacts 34, conductor 76, through auxiliary switch 68, to the other side of the auxiliary source.

The low voltage auxiliary source 71 now operates to cause a testing or "feeler" current to pass through the load circuit and the control means 21 in series, to measure the impedance of the load circuit. In this case the impedance of the load circuit comprises exclusively a measurement of ohmic resistance, as the reactance component is practically nil. When the impedance of the load circuit reaches a predetermined amount, the current through the control means 21 falls to a value such that contacts 27 are closed and contacts 28 opened either instantly or with a time delay. This operation of the control means 21 automatically closes the energizing circuit of closing coil 63 as described through contacts 64 which are closed by the relay 65 as soon as the breaker opens, and contacts 27 which are closed when the control means operates. The auxiliary source 71 is thereby disconnected from the load circuit and the main source of supply reconnected to the load through the automatic reclosing of the circuit breaker 60.

What I claim as new and desire to secure by Letters Patent of the United States, is:—

1. In combination with a load circuit, a main source of current, and a circuit breaker connected between said source and said load circuit, of a system for automatically reclosing said circuit breaker, comprising an auxiliary source of current, a closing circuit for said circuit breaker, a control relay for controlling said closing circuit, an energizing circuit for said control relay, normally open contacts in said energizing circuit adapted to be closed by the opening of said breaker, a holding circuit for said control relay including said auxiliary source and said load circuit in series so that the current therein is a measure of the impedance of the load circuit, normally open contacts in said holding circuit adapted to be closed by said control relay when said energizing circuit is completed, and means controlled by said control relay for rendering said energizing circuit ineffective to maintain said relay in its energized position.

2. In combination with a load circuit, a main source of current, and a circuit breaker connected between said source and said load circuit, of a system for automatically reclosing said circuit breaker, comprising an auxiliary source of current, a closing circuit for said circuit breaker, a control relay for controlling said closing circuit, an energizing circuit for said control relay, normally open contacts in said energizing circuit adapted to be closed by the opening of said breaker, a holding circuit for said control relay including said auxiliary source and said load circuit in series so that the current therein is a measure of the impedance of the load circuit, normally open contacts in said holding circuit adapted to be closed by said control relay when said energizing circuit is completed, normally closed contacts in said energizing circuit adapted to be opened upon the energization of said control relay, and means operative after the opening of said last mentioned normally closed contacts for maintaining said contacts open independently of said control relay.

3. In combination with a load circuit, a main source of current, and a circuit breaker connected between said source and said load circuit, of a system for automatically reclosing said circuit breaker, comprising an auxiliary source of current, a closing circuit for said circuit breaker, a control relay for controlling said closing circuit, an energizing circuit for said control relay, normally open contacts in said energizing circuit adapted to be closed by the opening of said breaker a holding circuit for said control relay including said auxiliary source and said load circuit in series so that the current therein is a measure of the impedance of the load circuit normally open contacts in said holding circuit adapted to be closed by said control relay when said energizing circuit is completed, normally closed contacts in said energizing circuit and a second relay arranged while energized to maintain said last mentioned contacts open, said second relay being arranged so that it is actuated by said control relay when energized to open said normally closed contacts in said energizing circuit and to complete an energizing circuit for itself.

4. In combination with a load circuit, a main source of current, and a circuit breaker connected between said source and said load circuit, of a system for automatically reclosing said circuit breaker, comprising an auxiliary source of current, a closing circuit for said circuit breaker, a control relay for controlling said closing circuit, an energizing circuit for said control relay, normally open contacts in said energizing circuit adapted to be closed by the opening of said breaker, a holding circuit for said control relay including said auxiliary source and said load circuit in series so that the current therein is a measure of the impedance of the load circuit, normally open contacts in said holding circuit adapted to be closed by said control relay when said energizing circuit is completed, normally closed contacts in said closing circuit adapted to be opened upon the energization of said control relay and to be maintained opened so long as the current in said holding circuit is above a predetermined value, normally closed contacts in said energizing circuit adapted to be opened upon the energization of said control relay, and means operative after the opening of said last mentioned normally closed contacts for maintaining said contacts open independently of said control relay.

5. In combination with a polyphase load circuit, a main source of polyphase current, and a circuit breaker connecting said load circuit to said main source and automatically opened in response to predetermined abnormal conditions, of means for automatically controlling the reclosing of said circuit breaker comprising an auxiliary source of polyphase current arranged to be connected to said load circuit when said circuit breaker is open, means associated with each phase of said load circuit, and arranged so as to receive from said auxiliary source when said circuit breaker is open a current which is a measure of the impedance of the phase with which it is associated, and a closing circuit for said circuit breaker controlled by each of said last mentioned means so that said circuit breaker is not closed until the impedance in each phase reaches a predetermined amount.

6. In combination with a load circuit, a main source of electrical supply, a circuit breaker connecting said load circuit to said main source and adapted to be automatically opened in response to abnormal conditions, means for automatically controlling the reclosing of said circuit breaker comprising an auxiliary source of testing potential inductively related to said main source, electroresponsive means arranged to be energized by said auxiliary source when the breaker opens to effect the connection of said auxiliary source to said load circuit, and a control means responsive to the current flow through said load circuit from said auxiliary source and operative to effect the closing of said circuit breaker when said current reaches a predetermined value.

7. In combination with a load circuit, a main source of alternating current supply, a circuit breaker connecting said load circuit to said main source and adapted to be automatically opened in response to abnormal conditions, means for automatically controlling the reclosing of said circuit breaker comprising a transformer supplying a substantially lower potential than said main source, means for closing said transformer circuit when the breaker opens, a control means energized by said transformer circuit and operative to connect said transformer to the load circuit, said control means then receiving a current which is a measure of the impedance of the load circuit and operating to effect the reclosing of said breaker a predetermined time after said current reaches a predetermined value.

8. In combination with a load circuit, a main source of current, a circuit breaker connecting said load circuit and said main source and adapted to be opened automatically in response to abnormal conditions on said load circuit, means for automatically controlling the reclosing of said circuit breaker comprising an auxiliary source of current, electroresponsive means arranged to be energized by said auxiliary source when said circuit breaker opens to effect the connection of said auxiliary source across said load circuit, and means responsive to the current flow through said load circuit from said auxiliary source and operative to effect the closing of said circuit breaker when said current reaches a predetermined value.

In witness whereof, I have hereunto set my hand this 20th day of March 1920.

OLIVER C. TRAVER.